United States Patent [19]

Hotta

[11] Patent Number: 4,614,407
[45] Date of Patent: Sep. 30, 1986

[54] ELECTROOPTICAL DEVICE HAVING FIXED TRANSLUCENT INDICIA

[75] Inventor: Yoshio Hotta, Atsugi, Japan

[73] Assignee: Canon Kabushiki Kaisha, Tokyo, Japan

[21] Appl. No.: 501,866

[22] Filed: Jun. 7, 1983

[30] Foreign Application Priority Data

Jun. 14, 1982 [JP] Japan ................................ 57-102581
Aug. 19, 1982 [JP] Japan ................................ 57-143842

[51] Int. Cl.$^4$ .................................................. G02F 1/13
[52] U.S. Cl. ............................ 350/339 R; 350/320; 350/341
[58] Field of Search .............. 350/339 F, 339 R, 341, 350/343, 344

[56] References Cited

U.S. PATENT DOCUMENTS 3,994,567 11/1976 Matsuo et al. ............... 350/343 X
4,410,887 10/1983 Stolov et al. ............... 350/339 F X
4,422,726 12/1983 Harris et al. ................ 350/343 X

FOREIGN PATENT DOCUMENTS 0023421 2/1981 European Pat. Off. ........ 350/339 F
0025714 3/1981 Japan ........................... 350/339 F
1336254 11/1973 United Kingdom ............ 350/344

Primary Examiner—John K. Corbin
Assistant Examiner—Richard F. Gallivan
Attorney, Agent, or Firm—Fitzpatrick, Cella, Harper & Scinto

[57] ABSTRACT

An electrooptical device comprises an insulating film on at least one of a pair of electrode plates, wherein the insulating film has an area defining a colored pattern.

14 Claims, 4 Drawing Figures

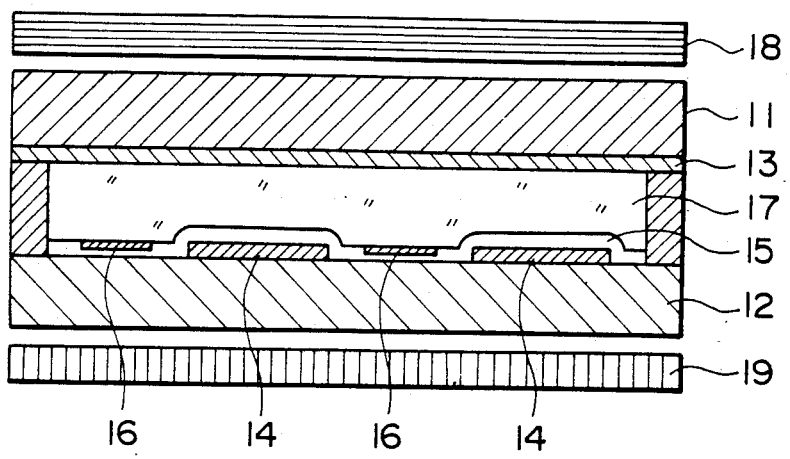
F I G. IA
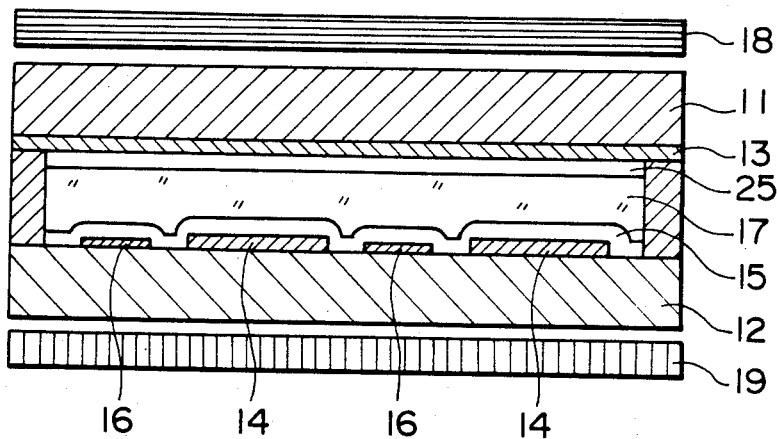
F I G. IB

ELECTROOPTICAL DEVICE HAVING FIXED TRANSLUCENT INDICIA

BACKGROUND OF THE INVENTION

1. Field of the Invention

This invention relates to an electrooptical device, in particular to a liquid crystal display device. More specifically, this invention relates to a liquid crystal display device provided with fixed display marks, numerals and/or characters or a display device provided with a so-called "half-display" permitting previous identification of the information to be displayed.

2. Description of the Prior Art

Liquid crystal display devices are generally provided with a section for displaying time or the like by segments in the form of numeral 8 (so-called operational display part) and a section for indicating a day of the week or other information by printed characters or the like (fixed display part.

In the conventional liquid crystal display device, a fixed display pattern of marks, numerals or characters is formed by the printing method or the like on the front glass plate or the reflecting plate. The liquid crystal display device provided with such a fixed display part has a drawback in that the fixed display pattern and the liquid crystal display pattern at the operational display part by application of a voltage between the electrodes will look visually deviating from the proper relative positions in proportion to the thickness of the glass (hereinafter, this phenomenon is referred to as the parallax effect).

Additionally, since the conventional display elements such as liquid crystal display elements and electrochromic display elements are transparent when no adequate operational signal is applied thereto, that is, they are not under operating conditions, there is such an inconvenience that the user cannot know in advance the contents of the information to be displayed by the elements.

In particular, when photographic information such as ASA speed, stop value and the like is displayed by using such a display device, it is very desirable for quick operation of photography to know in advance what kind of photographic information will be displayed and to form a clear display pattern of information which is easily visible.

Some liquid crystal display devices and electrochromic display devices have therefore been proposed that enable the user to discern in advance the information to be displayed. However, these display devices have defects in the appearance of display pattern, such as the parallax effect attributable to the thickness of the glass and a poor contrast between the half-display to the operational display, since a color filter having the same pattern as the electrode pattern is attached onto the outside of the glass plate of the display devices. In addition, because the color filter needs to be formed so as to have a prescribed pattern, the production of this type of display device requires inadvantageously many working steps and results in a high cost.

SUMMARY OF THE INVENTION

The primary object of this invention is to provide an electrooptical device which surmounts the above noted drawbacks.

Another object of this invention is to provide an electrooptical device having a half-display free of the parallax effect.

A further object of this invention is to provide an electrooptical device exhibiting a high contrast between the half-display and operational display.

Still another object of this invention is to provide an electrooptical device which has a half-display pattern and can be produced in a simplified process.

A still further object of this invention is to provide an electrooptical device which enables the contents, positions and configuration of the display to be confirmed in advance.

Still another object of this invention is to provide an electrooptical device, in particular a liquid crystal display device, having a fixed display pattern which can be observed together with the operational display pattern on the same plane.

According to this invention, there is provided an electrooptical device comprising an insulating film on at least one of a pair of electrodes thereof, said insulating film having an area defining a colored pattern.

BRIEF DESCRIPTION OF THE DRAWINGS

FIGS. 1A, 1B and 2 are sectional views of electrooptical devices of this invention.

DETAILED DESCRIPTION OF PREFERRED EMBODIMENTS

Figure 2:
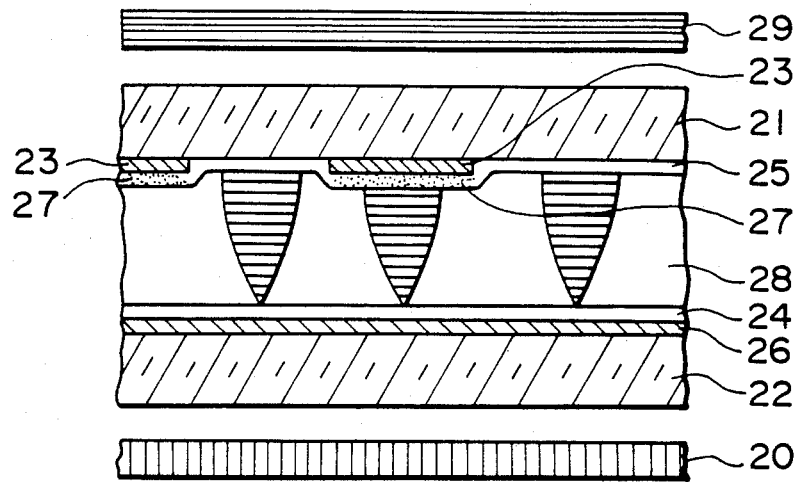

A preferred embodiment of this invention is an electrooptical device, for example a liquid crystal display device or electrochromic display device, provided with a fixed display pattern on its insulating film which functions as a molecular alignment controlling film.

Referring now to FIGS. 1A and 1B, this embodiment is described in detail.

The electrooptical device a sectional view of which is shown in FIG. 1A comprises an upper electrode plate having a substrate 11 and a counter electrode 13, and a lower electrode plate consisting of a substrate 12 and a display electrode 14. A liquid crystal 17 (nematic, cholesteric, or other type) is interposed between the electrode plates. The inner side of the lower electrode plate is coated with an aligning film (insulating film) 15 made of a resin material, for example poly(vinyl alcohols), polyimides, polyamides, polyesters or polycarbonates. This film can be treated by the usual method to have a function of aligning horizontally or vertically liquid crystals. A fixed display pattern 16 of marks, numerals or characters is formed in the aligning film 15, for example, in the following way: The lower electrode plate is coated with a poly(vinyl alcohol) resin by means of a spinner to a thickness of 1000–2000 Å. Further, the poly(vinyl alcohol) layer is coated with a photoresist composition (for example, "FRR No. 800" supplied by Fuji Yakuhin K.K.) by means of a spinner. The photoresist coating is exposed to light through a mask having a prescribed pattern of marks, numerals or characters and is developed. By this photolithographic process, the unexposed areas of the photoresist coating is removed to reveal the prescribed pattern of the poly(vinyl alcohol) coating, which corresponds to the intended fixed display pattern. The electrode plate is immersed for about 10 minutes in the following dyeing solution: "Sumifix Black B", "Sumifix Brilliant Red G", "Sumifix Brilliant Yellow 3GS" (these are products of Sumitomo Chemical Co., Ltd.), "Solophenyl NGL", or "Cibacet Grey NH" (these are products of Ciba-Geigy A.G.) in aqueous $Na_2CO_3$, NaCl or $NH_3$ so that the fixed display forming portion is dyed. After rinsing with water, the remaining photoresist coating is removed with an organic solvent, for example methyl ethyl ketone. The plate is dried and heated for about 15 minutes at about 150°–220° C. to fix the dye.

The electrooptical device a sectional view of which is shown in FIG. 1B, wherein the same numerals as in FIG. 1A represent the same respective members, has a fixed display part 16 (1000–2000 Å thick) between a lower electrode substrate 12 and an insulating film (molecular-alignment controlling film) 15. This fixed display part is formed by screen printing or the like on prescribed areas of the substrate 12, which supports also a display electrode 14, and then is coated with the insulating film 15.

In this invention, a liquid crystal display device can be prepared by applying an aligning treatment, for example, a rubbing treatment to the insulating film 15 to give it a molecular-orientation controlling function, assembling a cell with the lower electrode plate and the upper electrode plate so as to cross the rubbing direction of the insulating film 15 and that of the upper electrode plate at right angles (90°), injecting a nematic liquid crystal having a positive dielectric anisotropy, sealing the cell, and arranging polarizing plates 18 and 19 on both sides of the cell, respectively, to form parallel or cross nicols.

Materials used for the electrodes of the electrooptical device of this invention may include indium oxide, tin oxide, and these compounds containing antimony oxide. And, if necessary, nontransparent conductive materials such as aluminum, silver, copper, etc. may be used.

Substrates suitable for this invention may include plates or sheets of glass and plastics, for example acrylic resin, polyethylene, polypropylene, poly(vinyl chloride), polystyrene, poly(vinyl acetate) and poly(ethylene terephthalate).

Another preferred embodiment of this invention is a display device prepared by forming an insulating film on a substrate having a prescribed pattern of electrode and dyeing the electrode-covering areas of the insulating film in suitable colors, for example red, green, white and blue, to make these areas discernible as a half-display pattern (translucent dyed film).

According to this invention, the intended half-display can be formed by direct dyeing of an insulating film laid on an electrode plate which is a part constituting a liquid crystal display device or an electrochromic display device.

This invention is illustrated further referring to the following examples of liquid crystal display devices; however, this invention is not to be limited to these examples.

FIG. 2 shows a cross section of another preferred liquid crystal display device of this invention, wherein numerals 21 and 22 represent substrates consisting of a glass or plastic plate. An electrode 23 having a prescribed pattern is formed on the inner surface of the substrate 21, and further an insulating film 25 is overlaid to coat the electrode 23 and the remaining surface of the substrate 21. The insulating film 25 may be desirably composed of a dyeable material which is generally selected from poly(vinyl alcohol), gelatin, polyimide, polyamide, polyester and the like.

The electrode 23—covering regions 27 of the insulating film 25 may be dyed by a suitable method so as to be discernible as a half-display pattern. The insulating film 25 is subjected to the aligning treatment by rubbing in the direction intersecting the rubbing direction on another insulating film 24 formed on the counter electrode 26, thereby controlling a liquid crystal 28 arranged between the electrodes, to assume a twisted alignment at 90° in the direction perpendicular to the electrodes. In this case, a nematic liquid crystal having a positive dielectric anisotropy (Np liquid crystal) may be used.

Polarizing plates 20 and 29 are arranged severally on the outer sides of the liquid crystal cell having the above mentioned structure, to form cross nicols.

Figure 3:
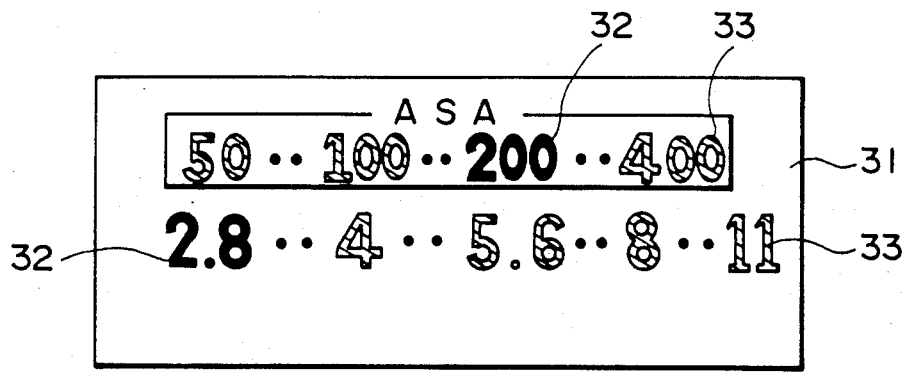
FIG. 3 is a plane view of an electrooptical device of this invention.

In this liquid crystal display device, upon application of a voltage between the electrodes 23 and 26, the molecular axes of the Np liquid crystal 28 are caused to align in the direction of the electric field. The incident light is therefore shut off between the cross nicols so that for example, a black display pattern 32 is developed in the liquid crystal display device 31 as shown in FIG. 3. This black display pattern 32 can be distinguished from a half-display pattern 33, which is differently colored by dyeing.

In the liquid crystal display devices shown in FIGS. 2 and 3, the color tone effect in the devices can be enhanced by using polarizing plates colored in blue, grey or red as the polarizing plates 20 and 29. A light diffusible reflection plate (not depicted) can be placed on the rear side of the polarizing plate 20.

The dyeing of the regions 27 covering the electrode pattern 23 can be accomplished, for example, in the following way: a poly(vinyl alcohol) coating as an insulating layer is formed on a substrate having thereupon a prescribed pattern of electrode. After a coating of a photoresist material (e.g. FPR No. 800 supplied by Fuji Yakuhin K.K.) is further formed on the insulating layer by a spinner, the photoresist is exposed to light while masking the areas other than those covering the electrode, and is developed. Then, the electrode-covering regions of the insulating layer are dyed by dipping them in a dyeing liquid (for example, 2% ammonia solution of "Sumifix Super Brilliant Red 3BF" of Sumitomo Chemical Co., Ltd.), and thereafter the mask is removed.

While poly(vinyl alcohol) can be mentioned as a preferred example of the materials used for the insulating film of the electrooptical device of this invention, the following materials can also be used: Polyamide resins such as nylon 6, nylon 66, nylon 610, nylon copolymers and alkoxymethylated nylon; polyimide resins prepared by dehydrating ring closure of condensation products of tetracarboxylic acid anhydrides such as pyromellitic anhydride with diamines such as 4,4'-diaminodiphenyl ether; polyester resins such as poly(ethylene terephthalate); and polycarbonate resins such as poly(4,4'-dioxydiphenyl-2-2'-carbonate).

Electrode plates suitable for use in the electrooptical device of this invention may be preferably substrates of glass or plastics, which have a transparent conductive film, e.g. indium oxide, tin oxide, or indium oxide-tin oxide (tin oxide contents: 0.1–40% by weight) film on at least one side thereof. Suitable nontransparent conductive films for use in this invention may include, e.g. those of aluminum, gold, silver, copper and lead.

The liquid crystals used in the display device of this invention are not particularly limited; various kinds of liquid crystals can be used. Liquid crystals for use in the twisted nematic liquid crystal display mode stated above may include Np liquid crystals, e.g. "ZLI-1216", "ZLI-1253", "ZLI-1285", "ZLI-1414", "ZLI-1565", and "ZLI-1694" of Merck & Co., Inc. in Germany. These liquid crystals can be used alone or in combination.

The primary advantage of this invention is that the fixed display pattern and the operational display pattern can be observed on the same plane and therefore are very easy to identify.

Additional advantages of this invention are as follows:

(1) The parallax effect attributable to the thickness of the glass plate or the like is eliminated.
(2) The process for producing the electrooptical device can be simplified.
(3) Bright displays can be achieved.
(4) A high contrast can be attained between the half-display and the dynamic display.
(5) Even a reflection type of display can be brightened.

I claim:

1. An electrooptical device comprising an insulating film on at least one of a pair of electrode plates thereof and a liquid crystal between the pair of electrode plates, at least one of the pair of electrode plates having an area defining a colored pattern in the form of characters, numerals or marks on the portion where any electrode is not formed, said area defining a colored pattern being formed with ink applied by printing and being covered with said insulating fim wherein said insulating film undergoes aligning treatment.

2. An electrooptical device according to claim 1, wherein said liquid crystal is of a nematic type having a positive dielectric anisotropy.

3. An electrooptical device according to claim 1, wherein said insulating film is a coating film of a resin.

4. An electrooptical device according to claim 3, wherein said resin is at least one selected from the group consisting of poly(vinyl alcohols), polyamides, polyimides, polyesters and polycarbonates.

5. An electrooptical device according to claim 4, wherein said resin is poly(vinyl alcohols).

6. An electrooptical device comprising (a) a pair of electrode plates provided respectively with insulating films and (b) a liquid crystal of a nematic type having a positive dielectric anisotropy provided between the pair of electrode plates, wherein either one of said insulating films has an area defining a colored pattern, and further, each insulating film undergoes aligning treatment for controlling the molecular alignment of the nematic liquid crystal, wherein the aligning directions of liquid crystal molecules in contact with the insulating films are crossed at right angles.

7. An electrooptical device according to claim 6, which is provided with a polarizing plate on the outer side of each electrode plate.

8. An electrooptical device according to claim 6 wherein said insulating film is a coating film of a resin.

9. An electro-optical device having a liquid crystal and a pair of electrode plates one of which carries an electrode pattern, the electrode portions of the patterned plate being covered by translucent insulating film which is colored by dyeing, the non-electrode portions of the patterned plate being covered with undyed insulating film, and the other electrode plate being covered by insulating film.

10. An electrooptical device according to claim 9, wherein said liquid crystal is of a nematic type having a positive dielectric anisotropy.

11. An electrooptical device according to claim 10, wherein the insulating films undergo aligning treatment.

12. An electro-optical device according to claim 9 wherein said translucent insulating film covered on said patterned plate is a resin selected from the group consisting of poly(vinyl alcohols), polyamides, polyimides, polyesters and polycarbonates.

13. An electrooptical device according to claim 12, wherein said resin is poly(vinyl alcohols).

14. A method for displaying information exhibiting a high contrast between an operational display and a half-display, said half-display being free of a parallax effect employing an electrooptical device (a) provided with at least one of a pair of electrode plates having a prescribed pattern of electrode in the form of a character, numeral, or mark, and (b) said electrode being further provided with a translucent dyed pattern of an inulating film, and comprising applying a voltage between said electrode plates to generate said operational display of a desired pattern while simultaneously displaying the half display dyed pattern.

* * * * *

UNITED STATES PATENT AND TRADEMARK OFFICE
CERTIFICATE OF CORRECTION

PATENT NO. : 4,614,407

DATED : September 30, 1986

INVENTOR(S) : Yoshio Hotta

It is certified that error appears in the above-identified patent and that said Letters Patent is hereby corrected as shown below:

Column 1, line 21, after "part" add --)--.

Column 1, line 61, "inadvantageously" should be --disadvantageously--.

Column 3, line 54, after "further" add --by--.

Column 4, line 1, "23-" should be --23--.

Column 5, line 41, "poly(vinyl alcohols)" should be --a poly(vinyl alcohol)--.

Column 6, line 32, "poly(vinyl alcohols)" should be --a poly(vinyl alcohol)--.

Column 6, line 41, "inulating" should be --insulating--.

Signed and Sealed this

Twentieth Day of January, 1987

Attest:

DONALD J. QUIGG

Attesting Officer

Commissioner of Patents and Trademarks